(12) United States Patent
Pettersson et al.

(10) Patent No.: US 11,039,340 B2
(45) Date of Patent: Jun. 15, 2021

(54) INTER-FREQUENCY LOAD BALANCING

(71) Applicant: Telefonaktiebolaget LM Ericsson (publ), Stockholm (SE)

(72) Inventors: Emil Pettersson, Helsingborg (SE); Samuel Axelsson, Linkoping (SE); Sven Ekemark, Storvreta (SE); Joakim Hellsten, Linkoping (SE); Dan Korsfeldt, Hasselby (SE); Parisa Pakniat, Norrkoping (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 375 days.

(21) Appl. No.: 16/081,948

(22) PCT Filed: Mar. 4, 2016

(86) PCT No.: PCT/EP2016/054687
§ 371 (c)(1),
(2) Date: Sep. 3, 2018

(87) PCT Pub. No.: WO2017/148535
PCT Pub. Date: Sep. 8, 2017

(65) Prior Publication Data
US 2020/0296625 A1   Sep. 17, 2020

(51) Int. Cl.
*H04B 7/022* (2017.01)
*H04B 7/0491* (2017.01)
(Continued)

(52) U.S. Cl.
CPC ............ *H04W 28/08* (2013.01); *H04B 7/022* (2013.01); *H04B 7/0491* (2013.01);
(Continued)

(58) Field of Classification Search
CPC .. H04B 7/02–12; H04B 17/0082–3913; H04L 5/003–0098; H04W 16/02–32;
(Continued)

(56) References Cited

U.S. PATENT DOCUMENTS

| 8,270,353 B2 | 9/2012 | Kim et al. |
| 9,125,091 B2 | 9/2015 | Heo et al. |

(Continued)

FOREIGN PATENT DOCUMENTS

| CN | 102948214 A | 2/2013 |
| CN | 103369572 A | 10/2013 |

(Continued)

OTHER PUBLICATIONS

Chinese Office Action dated Jul. 27, 2020 in connection with Chinese Application No. 201680083008.6, 13 pages.
(Continued)

*Primary Examiner* — Timothy J Weidner
(74) *Attorney, Agent, or Firm* — Leffler Intellectual Property Law, PLLC

(57) ABSTRACT

The present invention relates to a source node, a target node and methods for supporting re-distribution of load from a source cell to a target cell in a wireless network, wherein the target cell is a combined cell comprising a plurality of spatially separated sectors that are configured for downlink and/or uplink communication on a same carrier frequency. Performed in the source node, the method comprises receiving, from the target node, a load report comprising traffic load in one or more of the plurality of spatially separated target sectors comprised in the target cell. Reference signal measurements defining radio conditions for one or more of the target sectors comprised in the target cell are retrieved from one or more wireless devices served by the source node.

21 Claims, 6 Drawing Sheets

(51) Int. Cl.
*H04B 7/06* (2006.01)
*H04B 17/309* (2015.01)
*H04B 17/382* (2015.01)
*H04B 17/391* (2015.01)
*H04L 5/00* (2006.01)
*H04W 16/14* (2009.01)
*H04W 24/08* (2009.01)
*H04W 24/10* (2009.01)
*H04W 28/02* (2009.01)
*H04W 28/08* (2009.01)
*H04W 36/00* (2009.01)
*H04W 36/22* (2009.01)
*H04W 36/30* (2009.01)
*H04W 36/32* (2009.01)
*H04W 72/04* (2009.01)
*H04W 72/08* (2009.01)
*H04W 72/12* (2009.01)
*H04W 84/04* (2009.01)
*H04W 88/08* (2009.01)
*H04W 92/02* (2009.01)
*H04W 92/20* (2009.01)

(52) U.S. Cl.
CPC ......... *H04B 7/0626* (2013.01); *H04B 17/309* (2015.01); *H04B 17/382* (2015.01); *H04B 17/391* (2015.01); *H04L 5/0035* (2013.01); *H04L 5/0048* (2013.01); *H04L 5/0073* (2013.01); *H04W 16/14* (2013.01); *H04W 24/08* (2013.01); *H04W 24/10* (2013.01); *H04W 28/0226* (2013.01); *H04W 28/0247* (2013.01); *H04W 28/0808* (2020.05); *H04W 28/0942* (2020.05); *H04W 36/0061* (2013.01); *H04W 36/0072* (2013.01); *H04W 36/0085* (2018.08); *H04W 36/22* (2013.01); *H04W 36/30* (2013.01); *H04W 36/32* (2013.01); *H04W 72/04* (2013.01); *H04W 72/0426* (2013.01); *H04W 72/0486* (2013.01); *H04W 72/085* (2013.01); *H04W 72/1231* (2013.01); *H04W 72/1252* (2013.01); *H04W 84/04* (2013.01); *H04W 88/08* (2013.01); *H04W 88/085* (2013.01); *H04W 92/02* (2013.01); *H04W 92/20* (2013.01)

(58) Field of Classification Search
CPC ..... H04W 24/02–10; H04W 28/02–26; H04W 36/0005–385; H04W 48/02–20; H04W 72/005–14; H04W 84/02; H04W 84/04–047; H04W 88/005; H04W 88/08–12; H04W 92/02; H04W 92/04; H04W 92/12; H04W 92/16; H04W 92/20; H04W 92/22

See application file for complete search history.

(56) References Cited

U.S. PATENT DOCUMENTS

| | | |
|---|---|---|
| 2006/0135173 A1 | 6/2006 | Vannithamby |
| 2006/0166677 A1* | 7/2006 | Derakshan ............ H04W 36/14 455/453 |
| 2012/0063417 A1 | 3/2012 | Redana et al. |
| 2013/0272132 A1* | 10/2013 | Heo ................ H04W 28/0268 370/236.2 |
| 2013/0308473 A1 | 11/2013 | Sun et al. |
| 2014/0098670 A1* | 4/2014 | Choi .................... H04W 28/08 370/235 |

FOREIGN PATENT DOCUMENTS

| | | |
|---|---|---|
| CN | 104412654 A | 3/2015 |
| EP | 2874447 A1 | 5/2015 |
| WO | 2012125103 A1 | 9/2012 |
| WO | 2013125918 A1 | 8/2013 |
| WO | 2014117344 A1 | 8/2014 |
| WO | 2015014391 A1 | 2/2015 |

OTHER PUBLICATIONS

English language translation of Chinese Office Action dated Jul. 27, 2020 in connection with Chinese Application No. 201680083008.6, 3 pages.
PCT International Search Report, dated Sep. 29, 2016, in connection with International Application No. PCT/EP2016/054687, all pages.
PCT Written Opinion, dated Sep. 29, 2016, in connection with International Application No. PCT/EP2016/054687, all pages.
3GPP TSG-RAN WG1 #64, R1-110649, Taipei, Taiwan, Feb. 21-25, 2011, Ericsson, ST-Ericsson, Aspects on Distributed RRUs with Shared Cell-ID for Heterogeneous Deployments, 11 pages.
ETSI TS 136 331 V12.5.0, Apr. 2015, LTE; Evolved Universal Terrestrial Radio Access (E-UTRA); Radio Resource Control (RRC): Protocol Specification; 3GPP TS 36.331 version 12.5.0 Release 12, 579 pages.
ETSI TS 136 211 V12.5.0 Apr. 2015, LTE; Evolved Universal Terrestrial Radio Access (E-UTRA); Physical channels and modulation; 3GPP TS 36.211 version 12.5.0 Release 12, 139 pages.
ETSI TS 136 211 V13.0.0, Jan. 2016, LTE; Evolved Universal Terrestrial Radio Access (E-UTRA); Physical channels and modulation; 3GPP TS 36.211 version 13.0.0 Release 13, 143 pages.

* cited by examiner

INTER-FREQUENCY LOAD BALANCING

TECHNICAL FIELD

The present invention relates to a source node, a target node and methods and for supporting re-distribution of load from a source cell to a target cell in a wireless network, wherein the target cell is a combined cell comprising a plurality of spatially separated sectors that are configured for downlink and/or uplink communication on a same carrier frequency within each cell.

BACKGROUND

3GPP Long Term Evolution, LTE, is the fourth-generation mobile communication technology standard developed within the 3rd Generation Partnership Project, 3GPP, to improve the Universal Mobile Telecommunication System, UMTS, standard to cope with increasing requirements in terms of improved services such as higher data rates, improved efficiency, and lowered costs. LTE-Advanced and the fifth-generation, 5G, mobile communication technology standards are developed to meet further requirements in terms of improved services. One of the main tasks for 5G is to improve throughput and capacity compared to LTE. This is achieved by increasing the sample rate and bandwidth per carrier. 5G is also focusing on use of higher carrier frequencies i.e. above 5-10 GHz.

In a typical cellular radio system, wireless devices or terminals also known as mobile stations and/or User Equipment units, UEs, communicate via a Radio Access Network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a UE is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

The RBS provides communication services in one or more areas, or cells. A cell is further associated to at least one frequency band and a radio access technology. Wireless device in a cell served by the radio base station receives downlink radio transmissions and/or transmits uplink radio transmissions to the radio base station at a carrier frequency. In time division duplex, TDD, the same carrier frequency is used for both uplink and downlink, while in frequency division duplex, FDD, different carriers frequencies are used, typically at a specific duplex frequency separation.

While mobile communication technologies standards are developed to provide improved services, the data rates may still represent a limited resource. The users of various data services provide for a data usage that may be highly irregular depending on time of day, date and location. The cell load in one cell may be significantly higher in one cell as compared to that of other neighboring cells, with partial or full coverage overlap. Such load imbalance deteriorates performance of the cellular network as a whole; consequently, load balancing features have been developed.

Channel State Information, CSI, refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multi-antenna systems. Feeding back CSI to a transmitter in order for a transmitting network node or eNodeB to optimally utilize sparse radio spectrum for future transmissions is well established prior art.

Inter-frequency load balancing is used to manage uneven distribution of traffic load between different cells using different frequency resources, i.e. using different carrier frequencies. For load management purposes, each cell calculates load of connected devices/UEs and compares this with load reports received from neighbor cells. As mentioned, the inter-frequency load balancing is done between overlaid cells transmitting on different carrier frequencies. A source cell may be covered by several target cells using one carrier frequency, where different target cells cover different parts of the source cell, and several other target cells on another carrier frequency. If a neighbor cell has less load than a cell receiving load reports, load balancing may be achieved through handover or release with redirect performed to move one or several UEs from a source cell having the higher load to a target cell with lesser load, i.e. a load management triggered action. Thus, load balancing may be achieved by relocating Wireless device in connected mode to carrier frequencies that are underused compared with the carrier frequency in use. Load balancing enables efficient use of network resources on multiple carrier frequencies and achieves similar user experience independent of the carrier frequency in use. Inter frequency load balancing operate on cell level and use cell level statistics and UE measurements on cell level to make decisions about which UEs to move to which target cell/frequency.

A multi-sector cell, also denoted shared cell, soft cell, virtual cell or combined cell, in some cases, is a recent cell configuration for e.g. LTE and it enables a deployment that does not require extra cell planning efforts from a radio frequency perspective. Spatially separated radio resource units, RRUs, or a group of RRUs define a sector. In a legacy, individual cell, case there is one sector per cell. When a multi-sector cell is created, several sectors are combined into one cell, e.g., in order to avoid inter-cell handover when moving between the sectors. This is achieved by allowing different radio resource units, RRUs to use the same cell identity. Thus, from a view of a wireless device, all RRUs are perceived as belonging to the same cell. The combined cell is made up of two or more sectors that all use the same carrier frequency, i.e., maintaining use of one and the same frequency for all sectors of the cell. Transmission and reception to/from a wireless device can be done by one sector or by multiple sectors depending on the degree of sector isolation. The combined cell is identified by a unique global cell identity and all sector carriers that are present in the same cell are considered as one logical cell with the same Physical Cell Identity, PCI. Seen from the outside there is no difference between a combined cell and an "ordinary" cell. One RBS/eNB could be responsible for all radio related functions in the combined cell, but scenarios where sectors of the combined cell are set up from more than one RBS/eNB may also be foreseeable.

Using highly directional, non-overlapping antennas, the sectors may be allowed to use the same time and frequency resources, hereinafter referred to as carriers, thereby increasing the capacity of the network. For a combined cell with non-overlapping SDMA, Space-division multiple access, where each sector in the cell broadcasts its own specific Channel State Information Reference Signal, CSI-RS, it is possible to communicate with different UEs in different sectors using the same carriers, i.e., at the same time using the frequency resource. This increases the capacity in the combined cell since the radio resources within the cell are reused, by spatially separated users. With downlink spatial reuse, the cell capacity is assessed to be close to separate cell deployment and thus the capacity of the combined cell almost increases with a factor corresponding to the number of sectors when introducing SDMA. A standard deployment is to use three directional antennas per site, but other types of deployments are also foreseen. Sectorization may be done in a horizontal and/or vertical plane, but a horizontal sectorization may of course also have an impact in a vertical plane and vice versa.

However, a problem with the existing technology is that also for combined cells with SDMA, the inter frequency load balance handovers are done on cell level.

SUMMARY

For a situation when there are large load imbalances between individual sectors in a cell, traditional load balancing cannot be used to improve the situation. Actually there is a risk that a UE is moved from a low load sector of a first cell to a high load sector of a second cell when trying to achieve cell level load balance.

It is an object of the present disclosure to improve load management in a wireless network. In particular, it is an object of the disclosure to provide embodiments supporting load distribution to/from a cell that is configured with a plurality of spatially separated sectors that all use the same carrier frequency.

This object is obtained by a method of supporting re-distribution of load from a source cell to a target cell in a wireless network, wherein the target cell is a combined cell comprising a plurality of spatially separated sectors that are configured for downlink and/or uplink communication on a same carrier within each cell. The method comprises receiving from the target node, a load report defining traffic load in one or more of the plurality of spatially separated target sectors comprised in the target cell. The method also comprises retrieving from one or more user equipment, UE, served by the source node, reference signal measurements defining radio conditions for one or more of the target sectors comprised in the target cell.

The proposed solution enables improved load management by providing for exchange of sector level information in a wireless network comprising combined cells. Access to load balancing information on sector level in a combined cell scenario, together with reference signal measurements to identify the target sector in the target cell, ensures that the wireless devices are not relocated to a sector with higher load and lower throughput condition. Access to load balancing information relating to load in the source cell, e.g., in the sector of the wireless device in the source cell, is available to the source node. Access to load balancing information on sector level also ensures improved network performance management. A further benefit with the present solution is that it is compatible with normal cells as well, i.e., when there is only one sector in a cell. Thus the embodiments of the present disclosure will work for legacy cell level load balancing as well as sector level load balancing.

According to an optional aspect of the disclosure, the method also comprises selecting of one or more wireless devices served by the source cell for handover to the target cell when radio conditions of corresponding retrieved reference signal measurements fulfil a predetermined radio condition requirement and traffic load fulfils a predetermined traffic load requirement.

Thus, load balancing decisions are made based on information about the target sectors that are applicable for handover of one or more wireless devices, thereby enabling improved utilization of network resources.

According to an optional aspect, source traffic load is determined in the source cell and a load difference is determined between the source traffic load and traffic load in the one or more target sectors. Further according to an optional aspect, the source cell is a combined cell comprising a plurality of spatially separated source sectors that are configured for downlink and/or uplink communication on a same frequency band, and the determining of source traffic load in the source cell comprises determining traffic load in one or more source sectors.

Hence, the present disclosure provides the additional benefit of making decisions based on information on the source cell's sector applicable for the wireless devices which are concerned by the decision.

According to an aspect of the disclosure, the predetermined traffic load requirement for selecting one or more wireless devices for handover to a target cell is fulfilled when the determined load difference exceeds a predetermined threshold value. According to further aspects of the disclosure, the predetermined radio condition requirement for selecting one or more wireless devices for handover to target cell is fulfilled when reference signal measurements indicate a reference signal power that exceeds a predetermined power threshold.

According to a further aspect of the disclosure, reference signal measurements comprise measurements of Physical Cell Identity, PCI, Reference Signal Received Power, RSRP.

According to another aspect of the disclosure, the reference signal measurements also comprise respective Channel State Information Reference Signal, CSI-RS, measurements.

Thus, reference signal measurements are retrieved using standardized reference signals. As mentioned, this provides for compatibility with legacy cell level load balancing.

According to an optional aspect of the disclosure, the received load report is a first load report comprising traffic load and information for CSI-RS measurements for at least one first target sector comprised in the target cell. According to an optional further aspect of the disclosure, a subsequently received second load report comprises traffic load and information on CSI-RS for at least another second target sector comprised in the target cell. According to a further aspect, the load report and/or a cycle of consecutive load reports received from the target node comprises traffic load in the plurality of spatially separated target sectors and a CSI-RS pattern for the plurality of spatially separated target sectors comprised in the target cell.

Hence, load reports or load information may be periodically exchanged between the source node and target node.

The object of the disclosure is also obtained by a computer program comprising computer program code, which when executed in a source node executes the above disclosed method aspects.

The object of the disclosure is also obtained by a source node configured to support re-distribution of load from a source cell to a target cell in a wireless network, wherein the target cell is a combined cell comprising a plurality of spatially separated sectors that are configured for downlink and/or uplink communication on a same carrier frequency. The source node comprises radio circuitry arranged to transmit and receive radio signals from one or more wireless devices; communications circuitry arranged to transmit and receive communications signals from one or more target nodes, and processing circuitry arranged for receiving from the target node, a load report defining traffic load in one or more of the plurality of spatially separated target sectors comprised in the target cell, and retrieving, from one or more wireless devices, served by the source node, reference signal measurements defining radio conditions for one or more of the target sectors comprised in the target cell.

The advantages and benefits presented in relation to method aspects above are of course also applicable to the computer program configured to execute the method and the source node, comprising the computer program.

Furthermore, the object of the disclosure is obtained by a method performed in a target node, of supporting re-distribution of load from a source cell to a target cell in a wireless network, wherein the target cell comprises a plurality of spatially separated sectors that are configured for downlink and/or uplink communication on a same carrier frequency. The method comprises determining target traffic load in one or more of the plurality of spatially separated target sectors comprised in the target cell. A load report comprising the determined target traffic load is transmitted to a receiving source node.

A computer program comprising computer program code, which when executed in a target node executes the above disclosed method aspects also provide the above stated object of the disclosure.

A target node is configured to obtain the object of the disclosure, i.e., to support re-distribution of load from a source cell to a target cell in a wireless network, wherein the target cell is a combined cell comprising a plurality of spatially separated sectors that are configured for downlink and/or uplink communication on a same carrier frequency. The target node comprises communication circuitry arranged to transmit and/or receive communications signals to/from a source node. The target node also comprises processing circuitry that is arranged for determining target traffic load in one or more of the plurality of spatially separated target sectors comprised in the target cell. The processing circuitry is configured to provide a load report comprising the determined target traffic load to a receiving source node.

The target node embodiments provide corresponding benefits to those described above for the source node.

Knowledge of load relating to a specific target sector and an ability to verify radio conditions of the same target sector provides the ability to load balance between sectors that are a subset of a cell as a complement to load balancing between cells. With a development toward cell concept dissolution in future communications standards, there are significant benefits in making load balancing less dependent on cells and instead dependent on a subset of a cell coverage, e.g., a sector or beam.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
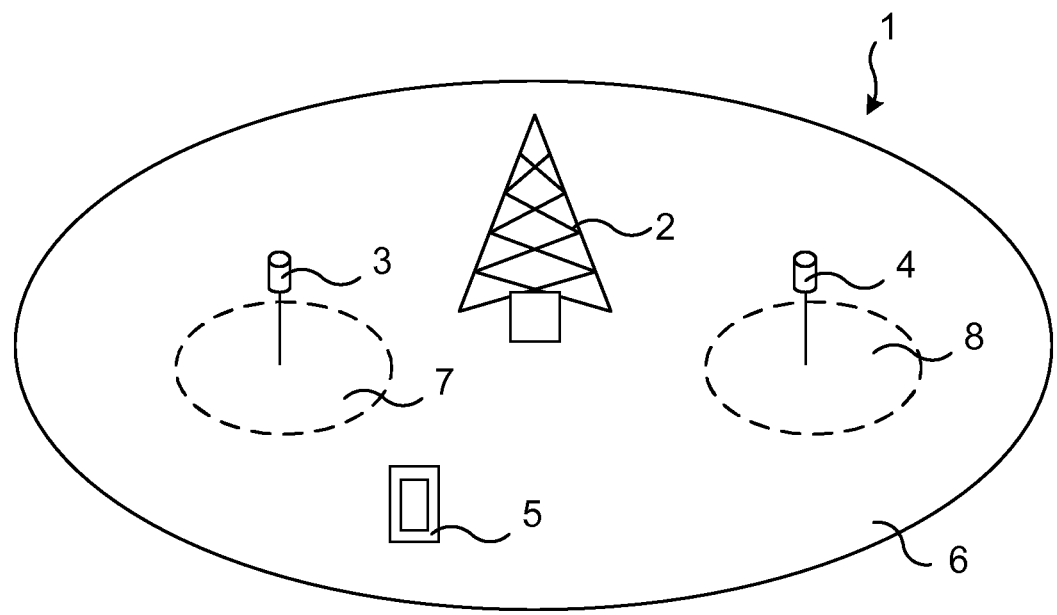
FIGS. 1 a, b illustrate the concept of individual cells and a combined cell.

Aspects of the present disclosure will be described more fully hereinafter with reference to the accompanying drawings. The arrangements and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise. It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

In the drawings and specification, exemplary embodiments are disclosed. However, many variations and modifications can be made to these embodiments. Accordingly, although specific terms are employed, they are used in a generic and descriptive sense only and not for purposes of limitation, the scope of the embodiments being defined by the following claims.

Combined cell, also denoted shared cell, soft cell, virtual cell or multi-sector cell in some cases, is a recent cell configuration for e.g. Long Term Evolution, LTE, and enables a multi Radio Resource Unit, RRU, deployment that does not require extra cell planning effort from a Radio Frequency, RF, perspective. This is achieved by allowing the different RRUs to use the same Physical Cell Identity, PCI, and thus all RRUs are considered, by a wireless device, to be part of the same cell. The spatially separated RRUs, or group of RRUs, serve respective sectors. A cell can contain multiple sectors, and transmission/reception to/from a wireless device can be done by an RRU of one sector or RRU:s of multiple sectors depending on the degree of sector isolation. The same time and frequency resources may also be used on different sectors.

The combined cell extends the indoor and outdoor coverage of a single cell and entails several advantages. Coverage holes may be reduced by allowing multiple coverage areas within the same cell. There is no need for inter-cell handover within a combined cell.

In the deployment of combined cell, an evolved Node B (eNodeB or eNB) needs to keep track of which sector(s) a wireless device should use. This sector selection is done by using an uplink control or data channel. Basically, the eNB orders periodic control or data channel transmissions across all sectors of the combined cell and by measuring, for a specific communication device, received signal strength/ channel quality on all sectors, the eNB can determine one or multiple sectors that the wireless device should belong to.

FIG. 1a schematically illustrates a wireless communication system 1 of a basic heterogeneous LTE, Long Term Evolution, network architecture, with individual cells 6,7,8 configured from respective network nodes 2,3,4 e.g., eNBs. A macro node 2 and low power nodes 3 and 4 cover respective individual cells 6, 7, 8 with different cell identities, i.e., each cell represents a logical cell with a respective Physical Cell Identity, PCI, that differs from that of the other cells. The eNBs are connected to each other via X2 interfaces. A wireless device 5 is served by one network node at a time and must undergo handover between the cells when necessary to maintain adequate radio coverage.

Figure 1B:
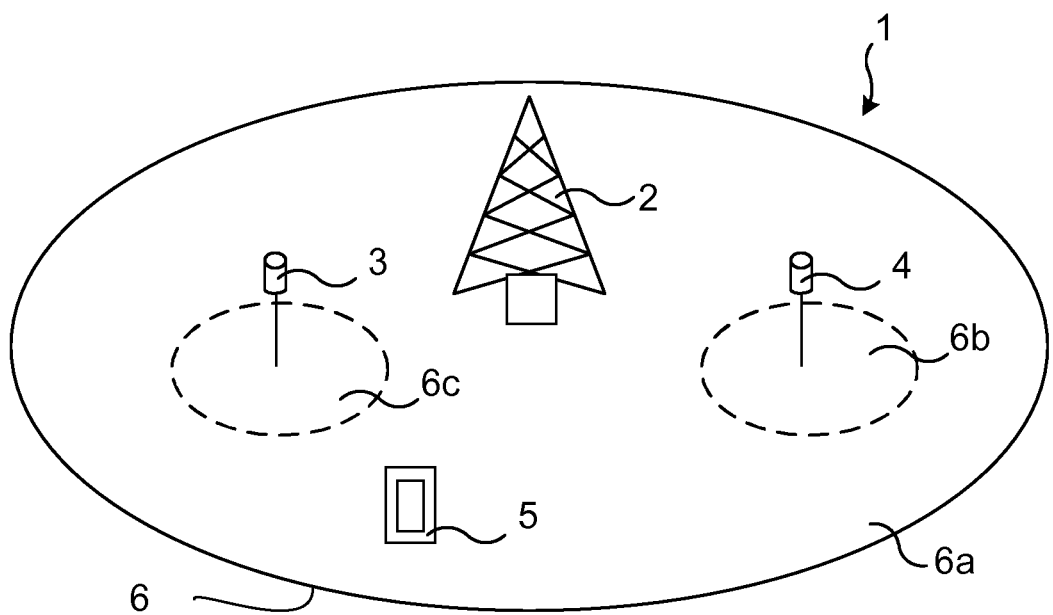

FIG. 1b schematically illustrates a wireless communication system 1 which implements heterogeneous network architecture with a combined cell deployment. A macro node 2 and low power nodes 3 and 4 cover the same common cell 6 with a shared cell identity, which means that a wireless device 5 in the cell can basically be served by several or all network nodes of the cell at the same time. The illustrated network nodes 2, 3, 4 use the same cell-specific identity (e.g. same physical cell identity, PCI) and therefore appears to communication devices 5 as a single cell. Within the coverage area of the combined cell 6 the communication device 5 may communicate with one or more of the network nodes 2, 3, 4. The network nodes 2, 3, 4 may for example comprise base stations such as eNBs (may also be referred to as access point) or remote radio units. The communication device 5 may be any type of wireless device, such as smart phone, mobile phone or laptop. The communication device is typically referred to as user equipment (UE) in wireless networks implementing LTE, but may also be denoted a mobile station or a subscriber station.

In a combined cell 6, multiple sectors 6a, 6b, 6c belong to the same cell, where a sector 6a, 6b, 6c is a geographical area served by a set of antennas, e.g., from a corresponding network node 2, 3, 4. A carrier with the same frequency is transmitted in all sectors and all the sectors 6a, 6b, 6c are considered together as one logical cell 6 with the same Physical Cell Identity, PCI. A carrier transmitted from a wireless device may also be received in all sectors.

A sector with its transmitted and received carrier is defined as a sector carrier. Uplink and downlink sector carrier selection within the same cell is supported. A choice or sector selection has to be made of which sector carriers (can be several) that shall transmit and receive dedicated signals for a wireless device.

The initial sector carrier selection is done from the power level of the received random access preambles, received at the different sector carriers. The sector carriers with the highest received power are selected.

For a combined cell with Space Division Multiple Access, SDMA, where each sector in the cell broadcasts its own specific Channel State Information Reference Signal, CSI-RS, it is possible to communicate with different wireless devices in different sectors at the same time. This increases the capacity in the combined cell since the radio resources within the cell are reused by spatially separated users. With downlink spatial reuse, the cell capacity is assessed to be close to separate cell deployment and thus the capacity of the combined cell almost increases with a factor corresponding to the number of sectors when introducing SDMA.

A problem with the existing technology is that also for combined cells with SDMA, the inter frequency load balance handovers are done on cell level. This means that the load balance decision is done without knowledge about which sector in the target cell the wireless device will end up in. Normally the wireless device is ordered to perform measurements and report back to a receiving RBS/eNB, information regarding the strongest cell on a specific carrier. However if the strongest cell is a combined cell with several sectors, it cannot be recognized by the reported PCI which sector is the strongest, i.e. the source cell will not know the target sector in the target cell.

This means that the load balance decision is done without knowledge about which sector in the target cell the UE will end up in. Furthermore, the decision is done without consideration of the load of the sector in the target cell or the load in the sector in the source cell. In cases where there are load imbalances between the sectors in a combined cell this can lead to load balance decisions that will actually degrade the system and/or UE performance even though they seem correct on cell level.

Figure 2:
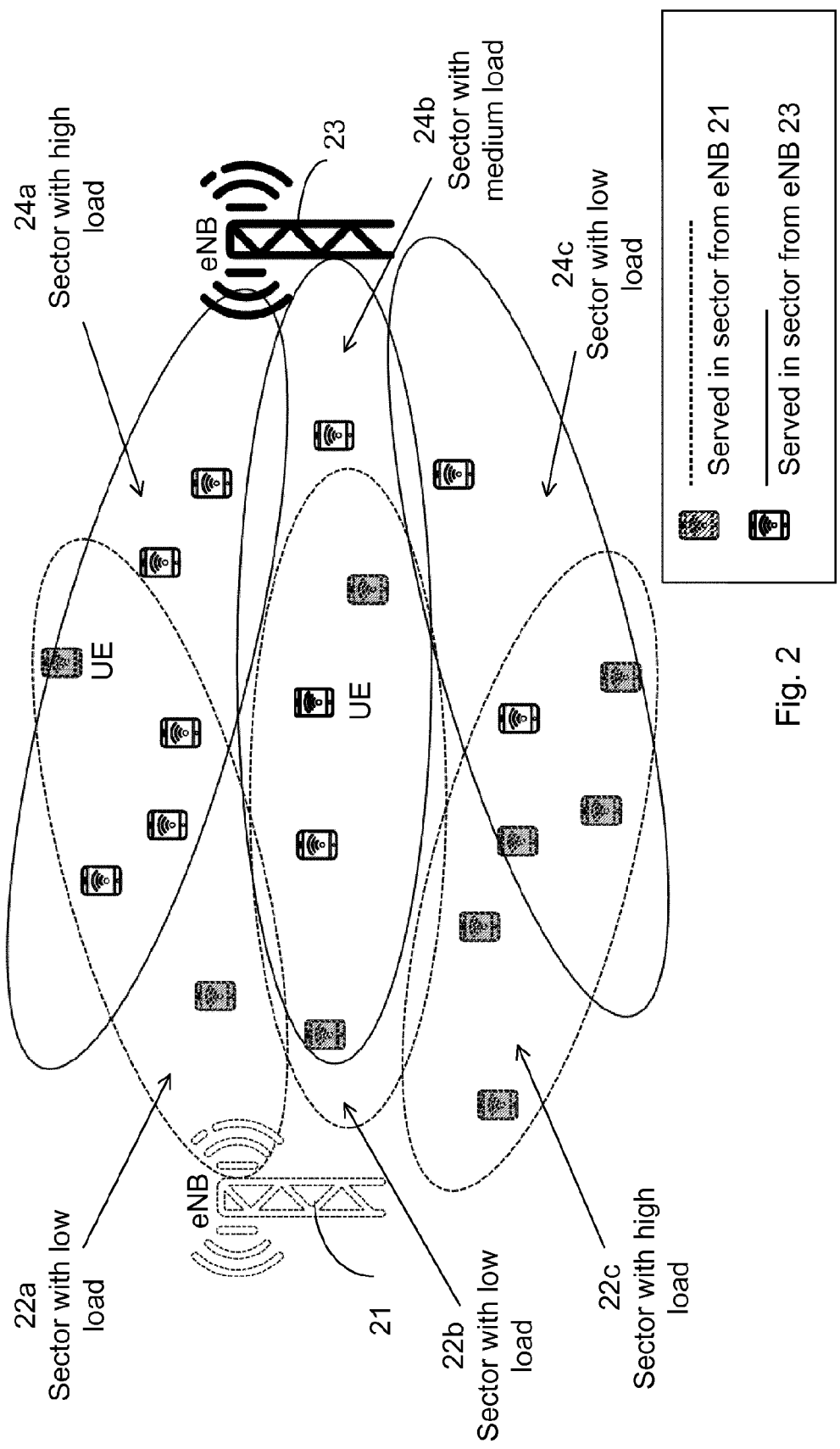
FIG. 2 illustrate load balance on cell and sector level.

FIG. 2 illustrates load balance on cell and on sector level. The figure visualizes a situation where an eNodeB 21 to the left, e.g. a source node, implements a combined cell on one frequency and the eNodeB 22 to the right, e.g. a target node, implements a combined cell on another frequency. In this case there is more or less equal load in the two cells, but there are large load imbalances between some of the individual sectors, e.g., between sector 22a with low load (illustrated with two UEs in the example of FIG. 2) and sector 24 a with high load (illustrated with five UEs in the example of FIG. 2).

Traditional load balancing that only uses cell level information cannot improve the situation illustrated in FIG. 2. Actually there is a risk that a wireless device is moved from a low load sector 22a to a high load sector 24a trying to achieve cell level load balance.

Figure 3:
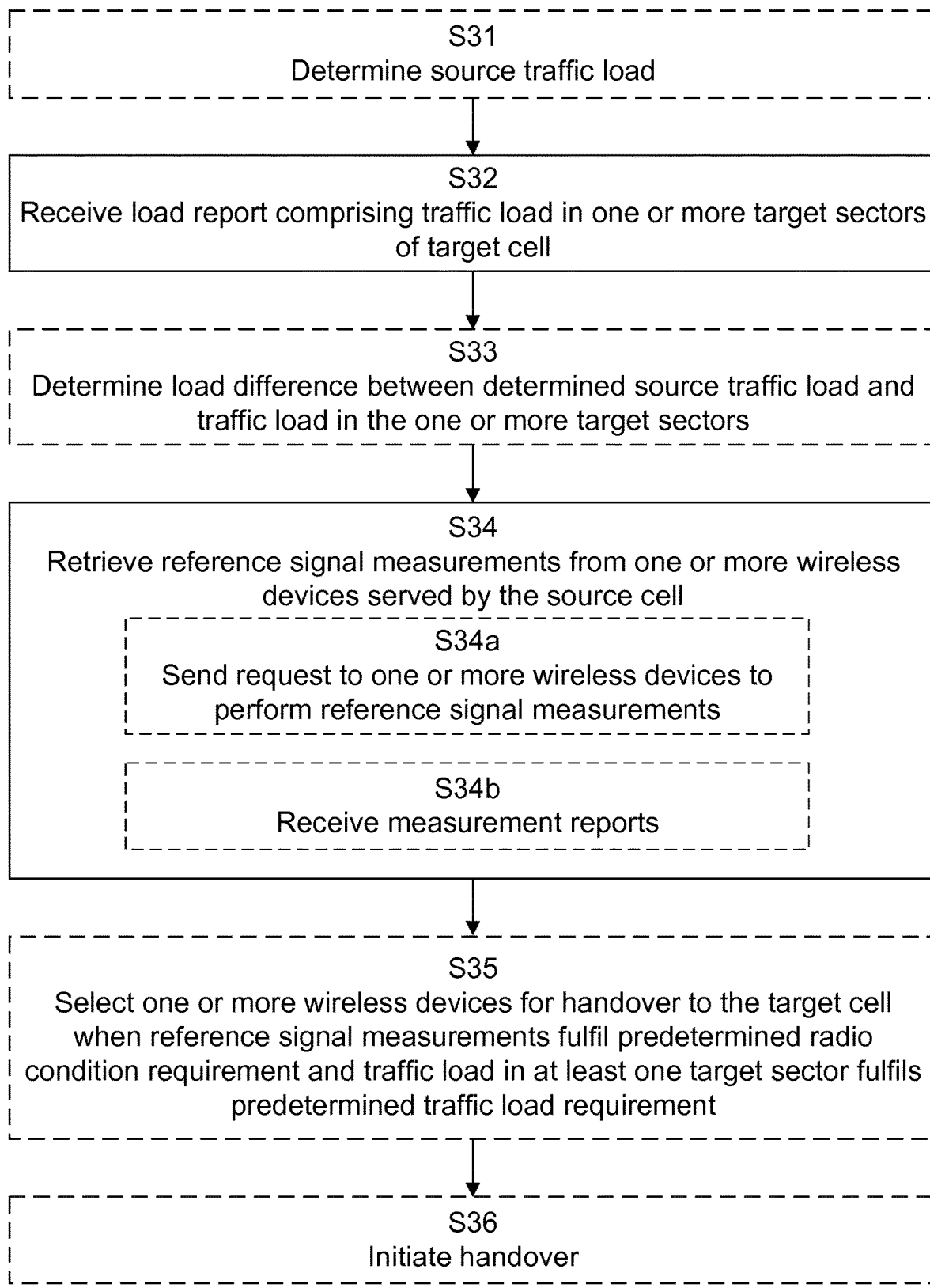
FIG. 3 is a flowchart illustrating embodiments of method steps performed in a source cell.

FIG. 3 is a flowchart illustrating embodiments of method steps. FIG. 3 illustrates a method, performed in a source node, of supporting re-distribution of load from a source cell to a target cell in a wireless network, wherein the target cell is a combined cell comprising a plurality of spatially separated sectors that are configured for downlink and/or uplink communication on a same carrier frequency, e.g. as disclosed in FIG. 1b. The source cell can be configured as an individual cell or as a combined cell comprising a plurality of spatially separated source sectors that are configured for downlink and/or uplink communication on a same frequency band.

In a step S32, the method comprises receiving, from the target node, a load report defining traffic load in one or more of the plurality of spatially separated target sectors comprised in the target cell. The load report may be exchanged via communications circuitry providing an X2 interface between network nodes of the wireless network. This information is received periodically, or in response to a request for information transmitted from the source node to one or more receiving nodes that are considered eligible target nodes based on node properties. In the following, it is assumed that the nodes are aware of each other's properties, e.g., in terms of network location, combined cell configuration and CSI-RS patterns that are used. However, such information may also be exchanged via, e.g., the X2 interface or manually configured in each node. Load reports defining the traffic load may be exchanged periodically. CSI-RS patterns, or CSI-RS configurations, are defined by 3GPP TS 36.211, V13.0.0, chapter 6.10.5, in which Table 6.10.5.2-2 is mapping a unique CSI-RS to correspond to a resource element, at a specific position in time and frequency.

According to an optional aspect of the disclosure the received load report is a first load report comprising traffic load and information on CSI-RS patterns for at least one first target sector comprised in the target cell, e.g., a target sector experiencing the lowest load in the target cell or a plurality of target sectors considered the best candidates for re-distribution of load. Load information can be defined and generated in several ways. One example is based on radio resource utilizations, such as percentage of Physical Resource Block (PRB) utilization or control channel utilizations. Other examples could be based on number of connected devices e.g. divided by the cell bandwidth in order to normalize with respect to cell capacity.

There may also be a need to take a time window into account, i.e., to determine if the load measure should reflect the instantaneous load, implying a time window of up to some 100 ms, or an average or weighted average over a longer period of time, implying a time a window of several seconds or even minutes.

According to another optional aspect of the disclosure, a subsequently received second load report comprises traffic load and information on CSI-RS for at least another second target sector comprised in the target cell and wherein traffic load and the CSI-RS pattern for the plurality of spatially separated target sectors of the target cell is comprised in a cycle of consecutive load reports received from the target node. Hence, reporting may be performed in a sector-by-sector manner, where load information is provided for all sectors of a target cell, but in separate traffic load report messages presenting traffic load information of respective sectors one at a time. According to a further optional aspect the received load report comprises traffic load in the plurality of spatially separated target sectors and a CSI-RS pattern for the plurality of spatially separated target sectors comprised in the target cell. Thus, provisioning of a comprehensive traffic load report for a plurality of spatially separated target sectors is of course also within the scope of the present disclosure.

The method, performed in the source node, further comprises a step S34 of retrieving, from one or more wireless devices served by the source node, reference signal measurements defining radio conditions for one or more of the target sectors comprised in the target cell. According to an aspect of the disclosure, the retrieving S34 of reference signal measurements comprises sending S34a a request to one or more wireless devices to perform the reference signal measurements and receiving corresponding measurement reports. For example, the source node may select one or more wireless devices, e.g., based on geographical location, to perform measurements on the carrier frequency of the target cell. Those wireless devices reporting the desired target cell as the strongest cell are ordered to perform another measurement to identify which target sector that is the strongest, e.g., the sector with highest Channel State Information Reference Signal, CSI-RS, Reference Signal Received Power, RSRP. According to an aspect of the disclosure, the reference signal measurements comprise Physical Cell Identity, PCI, Reference Signal Received Power, RSRP, measurements and/or respective Channel State Information Reference Signal, CSI-RS, measurements. The CSI-RS measurements are made by the wireless devices to provide further information to the source node on the strongest sector in the target cell, i.e., the strongest sector is identified by measuring on CSI-RS for at least one target sector comprised in the target cell and information on the strongest sector is included in the measurement reports.

According to another aspect of the disclosure, the retrieving S34 comprises receiving measurement reports S34a including wireless device reference signal measurements and matching received measurements to respective target sectors. The wireless device may report the strongest target sector to the receiving source node that checks a load condition of that target sector to determine if there is a need to balance the load towards that sector before initiating handover. Hence, reference signal measurements of one or more target cell frequencies may be received without solicitation from wireless device connected to the source node. The received reference signal measurements are matched using the CSI-RS pattern for the target sectors.

According to an aspect of the disclosure, the source node is configured to determine S31 source traffic load in the source cell. As previously mentioned, the source cell may also be a combined cell comprising a plurality of spatially separated sectors that are configured for downlink and/or uplink communication on a same carrier frequency. In this instance, the determining of source traffic load in the source cell comprises determining traffic load in one or more source sectors.

Re-distribution of load from a source cell or sector to a target sector may be based on determining S33 a load difference, i.e. a difference between traffic load of the one or more target sectors and the traffic load of the source sector or cell or vice versa. Each source node may calculate a sector-to-sector relation where load balancing should be applied or a cell-to-sector relation when applicable. The source node configures one or more wireless devices to perform inter-frequency measurements at the target frequency. If an event criteria is satisfied, the wireless devices returns a measurement report including CSI-RS quantities based on which the source node is capable to determine the likely entity where a wireless device would end up following handover.

Thus, when a reported target sector matches a load difference requirement, e.g., a load difference above a predetermined threshold, the wireless device may be relocated to the target cell. The source node has awareness of the load difference towards each target sector and knows how many wireless devices that should be handed over. When a measurement report is received it is checked if the reported target sector is still less loaded so that there is a need for another handover. In step S35, one or more wireless devices, served by the source cell, are selected for handover to the target cell based on a combination of the retrieved reference signal measurements, wherein the reference signal measurements may include RSRP, CSI-RS, and RSRQ measurements.

According to a further aspect of the disclosure, handover is initiated S36 of the selected one or more wireless devices to the target cell. While handover typically is performed on cell level, handover to a selected target sector is also within the scope of the present disclosure. The one or more wireless devices are selected for handover to a target sector when the radio conditions of corresponding retrieved reference signal measurements fulfils a predetermined radio condition requirement, normally an absolute RSRP threshold which is configured manually in the source cell. Such RSRP thresholds are well known from other type of event measurements, e.g., event A4 or A5 in 3GPP Technical Specification 36.331. Furthermore, traffic load in a reported target sector should fulfil a predetermined traffic load requirement. The predetermined traffic load requirement is a load difference requirement, as discussed above, between traffic load in the reported target sector and determined source traffic load.

It should be appreciated that FIG. 3 comprises some operations which are illustrated with a darker border and some operations which are illustrated with a dashed border. The operations which are comprised in a darker border are operations which are comprised in the broadest example embodiment. The operations which are comprised in a dashed border are example embodiments which may be comprised in, or a part of, or are further operations which may be taken in addition to the operations of the border example embodiments. It should be appreciated that these operations need not be performed in order. Furthermore, it should be appreciated that not all of the operations need to be performed. The example operations may be performed in any order and in any combination.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIG. 3. The particular sequence of such executable instructions or associated data structures represents examples of corresponding acts for implementing the functions described in such steps or processes.

Figure 4:
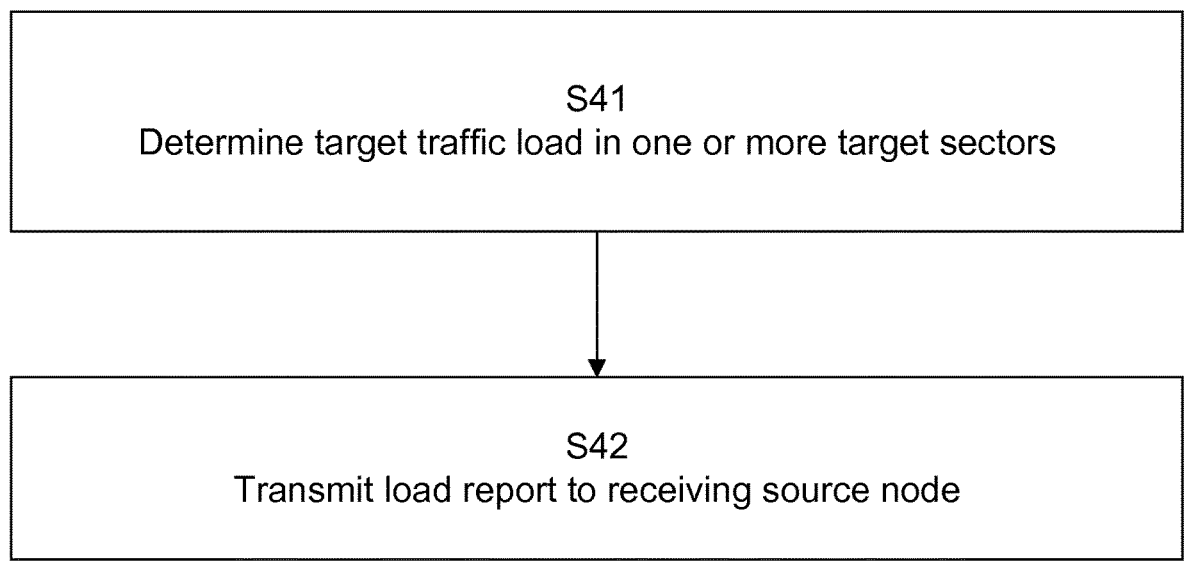
FIG. 4 is a flowchart illustrating embodiments of method steps performed in a target cell.

FIG. 4 is a flowchart illustrating embodiments of method steps. FIG. 4 illustrates a method, performed in a target node, of supporting re-distribution of load from a source cell to a target cell in a wireless network, wherein the target cell comprises a plurality of spatially separated sectors that are configured for downlink and/or uplink communication on a same carrier frequency. The method comprises the step S41 of determining target traffic load in one or more of the plurality of spatially separated target sectors comprised in the target cell. The method, performed in the target node, further comprises the step S42 of transmitting, to a receiving source node, a load report comprising the determined target traffic load. According to an aspect of the disclosure, the load reports also comprise information on CSI-RS for at least one first target sector comprised in the target cell. According to another aspect of the disclosure, further load reports, e.g., a second load report, comprise traffic load and information on CSI-RS for at least a second target sector comprised in the target cell. Traffic load and a CSI-RS pattern for the plurality of spatially separated target sectors of the target cell is comprised in a cycle of consecutive load reports compiled and transmitted from the target node. The load report is arranged to define traffic load in respective target sectors. Traffic load per sector is determined in line with traffic load per cell, e.g., by determining PRB utilization per sector or number of connected wireless devices per sector. As mentioned, comprehensive reporting of the traffic load of the target cell is ensured, either by compiling and transmitting a load report defining traffic load for all of the plurality of spatially separated target sectors comprised in the target cell, or by transmitting sector-by-sector load reports wherein a first load report comprises traffic load and information on CSI-RS for at least one target sector comprised in the target cell.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIG. 4. The particular sequence of such executable instructions or associated data structures represents examples of corresponding acts for implementing the functions described in such steps or processes.

Figure 5:
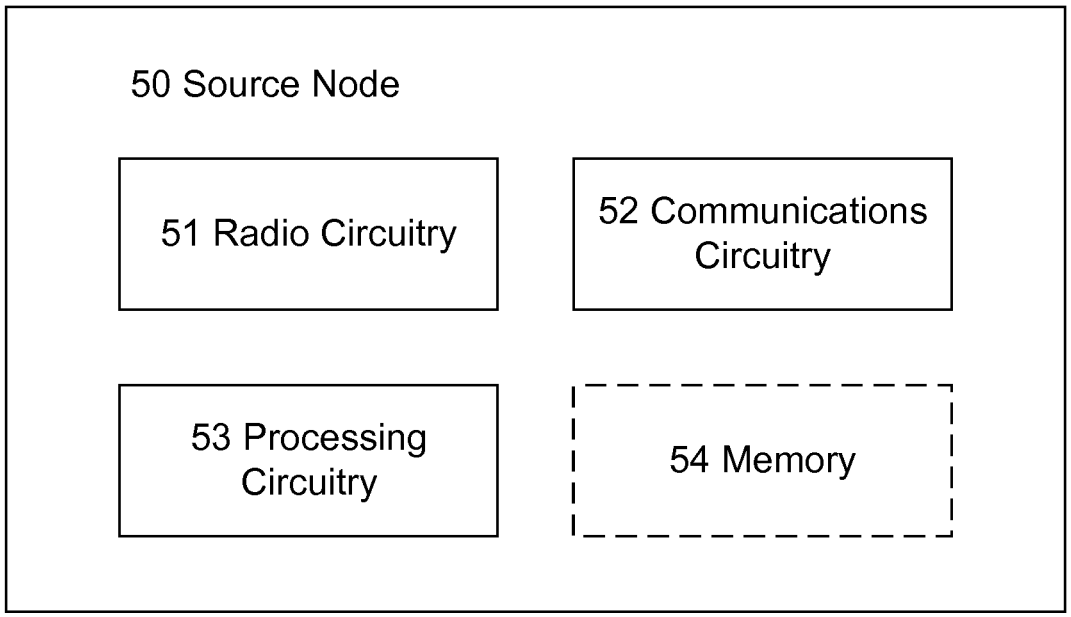
FIG. 5 is an example node configuration of a source node, according to some of the example embodiments.

FIG. 5 is an example node configuration of a source node 50 according to some of the example embodiments. The illustrated source node 50 is an example of an eNodeB which may incorporate some of the example embodiments discussed above. The source node is configured to support re-distribution of load from a source cell to a target cell in a wireless network, wherein the target cell is a combined cell comprising a plurality of spatially separated sectors that are configured for uplink and/or downlink communication on a same carrier frequency. As shown in FIG. 5, the source node 50 may comprise a radio circuitry 51 arranged to transmit and receive radio signals from one or more wireless devices. It should be appreciated that the radio circuitry 51 may be comprised as any number of transceiving, receiving, and/or transmitting units or circuitry. It should further be appreciated that the radio circuitry 51 may be in the form of any input/output communications port known in the art.

The source node 50 further comprises communications circuitry 52 arranged to transmit and/or receive communications signals from one or more target nodes, e.g., over the X2 interface. It should further be appreciated that the communications circuitry 52 may be in the form of any input/output communications port known in the art.

Processing circuitry 53 is arranged to control source node operation as a radio access node in the wireless network. Such control may also apply to one or more sectors when the source node is configured for a combined cell, i.e., a cell comprising a plurality of spatially separated sectors that are configured for downlink and/or uplink communication on a same carrier frequency. In particular, the processing circuitry 53 controls handover of wireless devices connected to the source node to one or more receiving nodes. The processing circuitry 53 is arranged for receiving from the target node, by means of the communications circuitry, a load report defining traffic load in one or more of the plurality of spatially separated target sectors. The processing circuitry is further arranged to retrieve reference signal measurements from one or more wireless devices served by the source, the reference signal measurements defining radio conditions for one or more of the target sectors comprised in the target cell. Thus, the processing circuitry is configured to use information received by the communications circuitry together with measurements associated to a reporting wireless devices to make handover decisions relating to a target sector of a target cell. The processing circuitry may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

The source node 50 may further comprise at least one memory unit or circuitry 54 that may be in communication with the processor. The memory is configured to store information about served wireless devices, as well as information about neighbor cells and their sectors, and radio condition measurements. The processing circuitry is further configured to use load information, that may be stored in the memory 54 about the load in the target sector and the source cell or a serving sector, and to make decisions about whether to initiate a load balancing handover for one or more connected wireless devices providing the reference signal measurements. The memory 54 may be configured to store received or transmitted data and/or executable program instructions. The memory 54 may be any suitable type of computer readable memory and may be of volatile and/or non-volatile type.

It should be understood that entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions disclosed as performed in a certain order in a block of the block diagram can occur out of the order.

Figure 6:
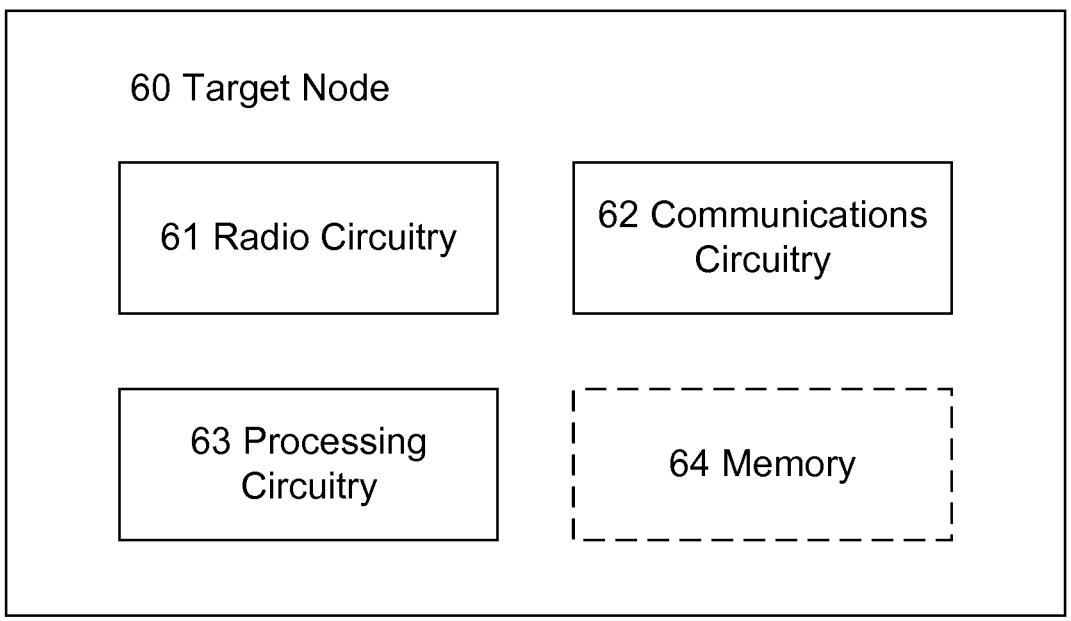
FIG. 6 is an example node configuration of a target node, according to some of the example embodiments.

FIG. 6 is an example node configuration of a target node 60 according to some of the example embodiments. The illustrated target node 60 is an example of an eNodeB which may incorporate some of the example embodiments discussed above. The target node is configured to support re-distribution of load from a source cell to a target cell in a wireless network, wherein the target cell is a combined cell comprising a plurality of spatially separated sectors that are configured for uplink and/or downlink communication on a same carrier frequency. As shown in FIG. 6, the target node 60 may comprise a radio circuitry 61 arranged to transmit and receive radio signals from one or more wireless devices. It should be appreciated that the radio circuitry 61 may be comprised as any number of transceiving, receiving, and/or transmitting units or circuitry. It should further be appreciated that the radio circuitry 61 may be in the form of any input/output communications port known in the art.

The target node 60 further comprises communications circuitry 62 arranged to transmit and/or receive communications signals from one or more target nodes, e.g., over the X2 interface. It should further be appreciated that the communications circuitry 62 may be in the form of any input/output communications port known in the art.

Processing circuitry 63 is arranged to control target node operation as a radio access node in the wireless network. Such control also applies to the plurality of spatially separated sectors in the combined cell configuration of the target node, i.e., sectors that are configured for downlink and/or uplink communication on a same carrier frequency. The processing circuitry 63 is arranged for determining target traffic load in one or more of the plurality of spatially separated target sectors comprised in the target cell. The processing circuitry 63 is further arranged to transmit, by means of the communications circuitry, to a receiving source node, a load report comprising the determined target traffic load. The processing circuitry may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

The target node 60 may further comprise at least one memory unit or circuitry 64 that may be in communication with the processor. The memory is configured to store information about neighbor cells and their sectors. The processing circuitry is further configured to use load information that may be stored in the memory 64 about the load in the target sector. The memory 64 may be configured to store received or transmitted data and/or executable program instructions. The memory 64 may be any suitable type of computer readable memory and may be of volatile and/or non-volatile type.

It should be understood that entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions disclosed as performed in a certain order in a block of the block diagram can occur out of the order.

Figure 7:
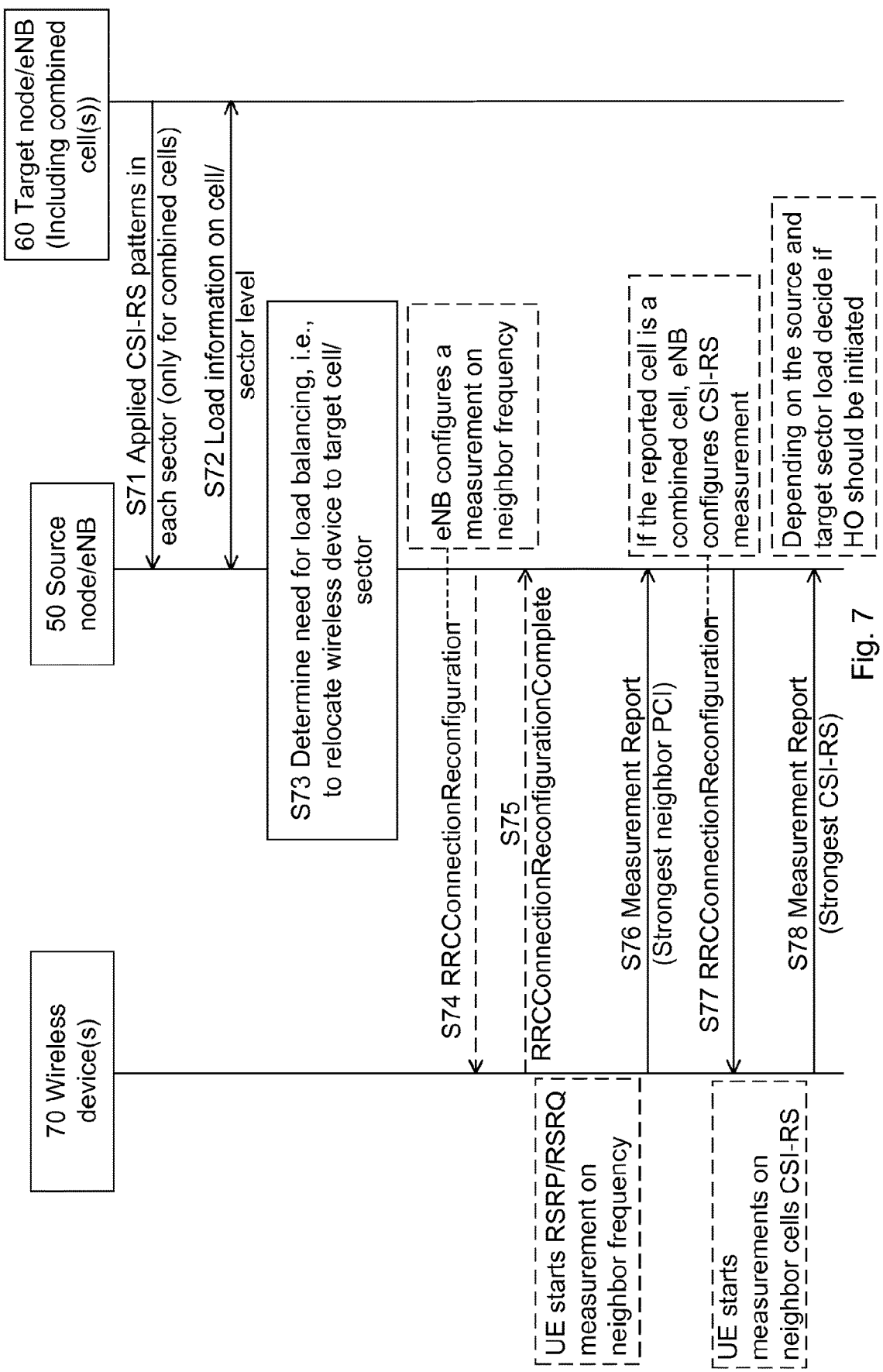
FIG. 7 is a signaling diagram illustrating an exchange of signals in an embodiment of a mobile network.

FIG. 7 is an example signaling diagram illustrating an exchange of signals in an embodiment of a wireless network comprising the above disclosed source node 50 and target node 60. The example shows load balancing performed between two neighbor cells that may be located in the same eNB or in separate eNBs. The target cell in this example is assumed to be a combined cell with a plurality of sectors. The source cell may be a combined cell or an individual cell. It is assumed that the cells are aware of each other's properties in terms of combined cell configuration and which CSI-RS patterns that are used. Information on CSI-RS patterns and other properties may be exchanged via the communications circuitry in the respective nodes, e.g., over the X2 interface using propriety or standard messages. The information may also be manually configured in each cell. It is also assumed that the load information, both on cell level and sector level, is periodically exchanged between the cells, i.e., from the target node 60 to the source node 50 and vice versa where applicable. This is illustrated in S71 where the target node 60 communicates, e.g., over the X2 interface, with a source node 50 providing information on applied CSI-RS patterns in each sector served by the target node.

Load information on cell or sector level, where applicable, is exchanged between the source node and the target node in S72. This signaling may be performed in any order.

Based on the exchange of load information, the source node 50 determines a need for load balancing in S73. Load balancing implies re-locating a connected wireless device to the target cell or sector, i.e., handover of a connected wireless device to the target node 60. When the source node 50 detects a lower load situation in sectors of the target node 60 than in the own cell/sector, it determines a need for load balancing or load re-distribution and decides to relocate one or more wireless devices to improve the load balance between the cells. The source node 50 requires information on radio conditions for the one or more wireless devices in order to successfully carry out the re-distribution of load. In an optional operation, the source node configures measurement on a neighbor frequency or carrier frequency corresponding to that of a selected target node in S74 "RRCConnectionReconfiguration". One or more wireless devices 70 are selected to measure on the target frequency or carrier frequency, e.g., selected based upon geographical location or randomly selected. Successful receipt of measurement configuration is confirmed in S75 "RRCConnectionReconfigurationComplete" from the selected wireless devices 70. However, if measurement reporting has already been configured for the wireless devices connected to the source node, e.g., as part of an on-going measurement procedure, the source node 50 may instead await receipt of one or more measurement reports S76.

As illustrated, the reporting from the wireless device 70 includes a measurement report S76 of the strongest neighbor PCI. When the source node determines that the reported cell is a combined cell, the source node configures CSI-RS measurement and requests measurements on neighbor cells CSI-RS in S77 "RRCConnectionReconfiguration". Thus, those wireless devices reporting the desired target cell, which is a combined cell, as the strongest cell are ordered to perform another measurement to identify which sector that is the strongest. Identifying the strongest sector in target cell is done by measuring on the CSI-RS for the sectors in the target cell. The wireless device 70 responds to this request by transmitting a measurement report S78 for at least the strongest CSI-RS. Using the information in the received measurement report and the current load of the source cell/sector and target sector, the source node decides whether to finalize the load balancing operation by initiating handover, HO, to the target node. Hence, if the reported sector matches a load difference requirement that may be predetermined, the wireless device is handed over to the target node, i.e., relocated to the target cell. While relocation is presented as being performed from cell to cell, this may in a future scenario be performed from cell to sector or from sector to sector. However, even when relocation is performed on cell basis, the resulting relocation will imply presence in the target sector providing the best combination of traffic load and traffic conditions.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other RATs, including LTE-advanced and the 5th generation mobile communication standard, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of source nodes, target nodes, corresponding methods, and computer program products. It should be appreciated that the example embodiments presented herein may be practiced in combination with each other.

The invention claimed is:

1. A method, performed in a source node, of supporting re-distribution of load from a source cell to a target cell associated with a target node in a wireless network, wherein the target cell is a combined cell comprising a plurality of spatially separated target sectors that are configured for downlink and/or uplink communication on a same carrier within each cell, the plurality of spatially separated target sectors being defined by respective spatially separated radio resource units using the same cell identity, wherein each target sector broadcasts a specific Channel State Information Reference Signal (CSI-RS), the method comprising:
   receiving from a target node, a load report comprising traffic load in one or more of the plurality of spatially separated target sectors comprised in the target cell, wherein the received load report is a first load report comprising information on Channel State Information Reference Signal (CSI-RS) patterns for at least one first target sector comprised in the target cell; and
   retrieving, from one or more wireless device served by the source node, reference signal measurements defining radio conditions for one or more of the target sectors comprised in the target cell, wherein the reference signal measurements comprise respective CSI-RS measurements.

2. The method of claim 1, further comprising selecting one or more wireless devices served by the source cell for handover to the target cell when radio conditions of corresponding retrieved reference signal measurements fulfils a predetermined radio condition requirement and traffic load fulfils a predetermined traffic load requirement.

3. The method of claim 2, wherein the predetermined radio condition requirement for selecting one or more wireless devices for handover to the target cell is fulfilled when reference signal measurements indicate a reference signal power that exceeds a predetermined power threshold.

4. The method of claim 1, further comprising:
   determining source traffic load in the source cell, and
   determining load difference between the source traffic load and traffic load in the one or more target sectors.

5. The method of claim 4, wherein a predetermined traffic load requirement for selecting one or more wireless devices for handover to the target cell is fulfilled when the determined load difference exceeds a predetermined threshold value.

6. The method of claim 5, wherein target sector of the handover is selected based on reference signal strength and an estimated resulting load distribution.

7. The method of claim 1, wherein the reference signal measurements comprise Physical Cell Identity (PCI), Reference Signal Received Power (RSRP) measurements.

8. The method of claim 7, wherein the request is sent to the one or more wireless devices based on geographical location of the one or more wireless devices.

9. The method of claim 1, wherein a subsequently received second load report comprises traffic load and information on CSI-RS for at least another second target sector comprised in the target cell and wherein traffic load and the CSI-RS pattern for the plurality of spatially separated target sectors of the target cell is comprised in a cycle of consecutive load reports received from the target node.

10. The method of claim 1, wherein the received first load report comprises traffic load in the plurality of spatially separated target sectors and CSI-RS patterns for the plurality of spatially separated target sectors comprised in the target cell.

11. The method of claim 1, wherein the retrieving of reference signal measurements comprises sending a request to one or more wireless devices to perform the reference signal measurements and receiving corresponding measurement reports.

12. The method of claim 1, wherein the retrieving of reference signal measurements comprises receiving reference signal measurements and matching received measurements to the target sectors.

13. The method according to claim 1, wherein the retrieved reference signal measurements comprise information on Reference Signal Received Power (RSRP) and Reference Signal Received Quality (RSRQ) on neighbour frequency.

14. The method of claim 1, wherein updated load reports are received with a predetermined periodicity.

15. The method of claim 1, wherein the source cell is also a combined cell comprising a plurality of spatially separated source sectors that are configured for downlink and/or uplink communication on a same frequency band, and wherein the determining of source traffic load in the source cell comprises determining traffic load in one or more source sectors.

16. The method of claim 15, wherein the source node operates as target node in support of dual direction load distribution or load distribution from other source nodes.

17. A non-transitory computer readable storage medium comprising computer program code which, when executed by one or more processors in a source node, causes the source node to execute a method of supporting re-distribution of load from a source cell to a target cell associated with a target node in a wireless network, wherein the target cell is a combined cell comprising a plurality of spatially separated target sectors that are configured for downlink and/or uplink communication on a same carrier within each cell, the plurality of spatially separated target sectors being defined by respective spatially separated radio resource units using the same cell identity, wherein each target sector broadcasts a specific Channel State Information Reference Signal (CSI-RS), the method comprising:

receiving from a target node, a load report comprising traffic load in one or more of the plurality of spatially separated target sectors comprised in the target cell, wherein the received load report is a first load report comprising information on Channel State Information Reference Signal (CSI-RS) patterns for at least one first target sector comprised in the target cell; and retrieving, from one or more wireless devices served by the source node, reference signal measurements defining radio conditions for one or more of the target sectors comprised in the target cell, wherein the reference signal measurements comprise respective CSI-RS measurements.

18. A source node configured to support re-distribution of load from a source cell to a target cell associated with a target node in a wireless network, wherein the target cell is a combined cell comprising a plurality of spatially separated sectors that are configured for downlink and/or uplink communication on a same carrier frequency, the plurality of spatially separated target sectors being defined by respective spatially separated radio resource units using the same cell identity, wherein each target sector broadcasts a specific Channel State Information Reference Signal (CSI-RS), wherein the source node comprises:

radio circuitry arranged to transmit and/or receive radio signals to/from one or more wireless device, communications circuitry arranged to transmit and/or receive communications signals to/from one or more target nodes, and processing circuitry arranged for:
receiving from the one or more target nodes, a load report defining traffic load in one or more of the plurality of spatially separated target sectors comprised in the target cell, wherein the received load report is a first load report comprising information on Channel State Information Reference Signal (CSI-RS) patterns for at least one first target sector comprised in the target cell; and retrieving, from one or more wireless devices served by the source node, reference signal measurements defining radio conditions for one or more of the target sectors comprised in the target cell, wherein the reference signal measurements comprise respective CSI-RS measurements.

19. A method, performed in a target node, of supporting re-distribution of load from a source cell to a target cell associated with a target node in a wireless network, wherein the target cell comprises a plurality of spatially separated target sectors that are configured for downlink and/or uplink communication on a same carrier frequency, the plurality of spatially separated target sectors being defined by respective spatially separated radio resource units using the same cell identity, wherein each target sector broadcasts a specific Channel State Information Reference Signal (CSI-RS), the method comprising:

determining target traffic load in one or more of the plurality of spatially separated target sectors comprised in the target cell; and transmitting, to a receiving source node, a load report comprising the determined target traffic load and information on Channel State Information Reference Signal (CSI-RS) patterns for at least one target sector comprised in the target cell.

20. A non-transitory computer readable storage medium comprising computer program code which, when executed by one or more processors in a target node, causes the target node to execute a method of supporting re-distribution of load from a source cell to a target cell associated with a target node in a wireless network, wherein the target cell comprises a plurality of spatially separated target sectors that are configured for downlink and/or uplink communication on a same carrier frequency, the plurality of spatially separated target sectors being defined by respective spatially separated radio resource units using the same cell identity, wherein each target sector broadcasts a specific Channel State Information Reference Signal (CSI-RS), the method comprising:

determining target traffic load in one or more of the plurality of spatially separated target sectors comprised in the target cell; and transmitting, to a receiving source node, a load report comprising the determined target traffic load and information on Channel State Information Reference Signal (CSI-RS) patterns for at least one target sector comprised in the target cell.

21. A target node configured to support re-distribution of load from a source cell to a target cell associated with a target node in a wireless network, wherein the target cell is a combined cell comprising a plurality of spatially separated target sectors that are configured for downlink and/or uplink communication on a same carrier frequency, the plurality of spatially separated target sectors being defined by respective spatially separated radio resource units using the same cell identity, wherein each target sector broadcasts a specific Channel State Information Reference Signal (CSI-RS), wherein the target node comprises:

communications circuitry arranged to transmit and/or receive communications signals to/from a source node, and processing circuitry configured to:

determine target traffic load in one or more of the plurality of spatially separated target sectors comprised in the target cell; and transmit, to a receiving source node, a load report comprising the determined target traffic load and information on Channel State Information Reference Signal (CSI-RS) patterns for at least one target sector comprised in the target cell.

* * * * *